United States Patent [19]

Marie

[11] 4,256,874

[45] Mar. 17, 1981

[54] PROCESS FOR SEPARATING ISOTACTIC AND ATACTIC POLYPROPYLENES

[75] Inventor: Gilbert Marie, Pau, France

[73] Assignee: Ato Chimie, Paris, France

[21] Appl. No.: 6,683

[22] Filed: Jan. 26, 1979

Related U.S. Application Data

[63] Continuation of Ser. No. 812,455, Jul. 5, 1977, abandoned.

[30] Foreign Application Priority Data

Jul. 12, 1976 [FR] France ................................. 7621292

[51] Int. Cl.³ ............................................... C08F 6/00
[52] U.S. Cl. ..................................... 528/486; 528/351
[58] Field of Search ......................................... 528/486

[56] References Cited

U.S. PATENT DOCUMENTS

| | | | |
|---|---|---|---|
| 3,125,560 | 3/1964 | Rose | 528/486 |
| 3,219,647 | 11/1965 | Dietz | 528/486 |
| 3,281,399 | 10/1966 | Renaldo et al. | 528/486 |
| 3,285,899 | 11/1966 | Houser et al. | 528/486 |
| 3,328,373 | 6/1967 | Tazewell et al. | 528/486 |
| 3,342,794 | 9/1967 | Buchanan | 528/486 |
| 3,499,880 | 3/1970 | Kutner | 528/486 |
| 3,661,884 | 5/1972 | Shell et al. | 528/495 |
| 3,709,850 | 1/1973 | Harrison et al. | 528/486 |
| 3,733,314 | 5/1973 | Marwil et al. | 528/496 |

*Primary Examiner*—Stanford M. Levin
*Attorney, Agent, or Firm*—Ostrolenk, Faber, Gerb & Soffen

[57] ABSTRACT

Isotactic and atactic polypropylene of acceptable purity are obtained by contacting the polymerized polymer with a mixture of hydrocarbon, alcohol, organic acid and diketone.

13 Claims, No Drawings

PROCESS FOR SEPARATING ISOTACTIC AND ATACTIC POLYPROPYLENES

This is a continuation of application Ser. No. 812,455, filed July 5, 1977, now abandoned.

The invention is concerned with a process for separating isotactic and atactic polypropylenes. It provides an improvement by obtaining each of these polymers in a state of improved purity, especially as regards the lowering of the content of catalytic residues originating from the polymerization.

A vast amount of literature is in existence regarding the purification of polypropylene produced by polymerization in the presence of catalysts which are based on organo-aluminum compounds and transition metals; this purification is in fact very important for the quality of the polymer; it is a question of removing at least the major part of the mineral compounds remaining after the polymerization. These compounds, which are usually those of aluminum, titanium and chlorine, have an unfavourable action on the stability, the resistance to ageing, the color and the smell of the polymer. Following the polymerization of ethylene or propylene by the process which uses the catalyst of the Ziegler type based on aluminum diethyl chloride and titanium chloride, the polymer generally contains several hundreds of parts per million of each of the elements Al, Ti and Cl; experience has shown that, for practical requirements, the content of these impurities has to be reduced so as not to exceed about 40 to 50 ppm for Al, 30 ppm for Ti and 30 to 40 ppm for Cl. Among the numerous methods of washing the polymer powder as so far proposed, the best results seem to have been obtained by a treatment with an alcohol-hydrocarbon mixture containing gaseous hydrochloric acid, as described in French Pat. No. 1 488 777. Although the use of HCl can lead to isotactic polypropylene of suitable purity, in which the content of the aforementioned elements is not more than of the order of 10 to 20 ppm, this process does not permit obtaining, at the same time, atactic polymer of acceptable purity. When attempting to extract the atactic polypropylene from the washing liquid used in this known process, depending on the proportion of gaseous HCl required for the washing, a product is obtained which includes about 10 to 25 by weight of chlorine in the form of chlorides.

All the aforementioned literature is only concerned generally with washing the isotactic polymer, the atactic polymer being usually left in the discarded residues, and forming a not inconsiderable loss of material. This form of polymer nevertheless has a certain utility, particularly in the preparation of coatings, adhesive compositions, varnishes, mastics, etc., and therefore it is still of interest to be able to separate it economically from the isotactic polypropylene, which is the main object of the manufacturing operation. However, for the recovery of the atactic polymer to be viable industrially, this product, in the crude state, must not contain too many impurities. As indicated above, the prior art yields a crude atactic polymer which is much too impure.

The present invention permits separating the isotactic and atactic polypropylenes under conditions such that each of them is obtained in the state of purity which is required industrially. Thus, the separation in accordance with the invention makes it possible to obtain, starting with the crude product, an isotactic polypropylene containing less than 5 ppm of Cl, less than 25 ppm of Al and less than 20 ppm of Ti. The separated atactic polymer may not contain more than 3% of total chlorine, which is perfectly acceptable for its subsequent use, as compared with about 10 to 25% in accordance with the prior art.

The process according to the invention consists in treating the solid polymer, separated from its liquid polymerization medium, or directly in the polymerization reaction medium containing it, with a mixture of an alcohol with a hydrocarbon, this mixture having added thereto an organic acid and a diketone. Preferably, the alcohol-hydrocarbon mixture is selected from those which form azeotropes boiling at temperatures below 100° C.; the polymer is kept in the boiling solvent mixture under reflux for a time which is sufficient to separate the atactic polypropylene and the residues of the catalyst system. After separation of the insoluble part by filtration of the liquid, this part is washed with the same solvent mixture, the washing liquid being reunited with that from the treatment at boiling point.

From the washing liquids, the atactic polypropylene can be recovered by evaporation of the solvent, possibly after a neutralization of the catalyst residues.

The solvent employed comprises one or more $C_6$ to $C_8$ saturated aliphatic hydrocarbons, particularly hexanes, cyclohexane, heptanes, octanes, $C_6$ to $C_8$ or $C_6$ to $C_7$ paraffin blends, etc. The alcohols which are preferred for being used in admixture with these hydrocarbons are $C_1$ to $C_4$ alcohols, particularly ethanol, propanols and butanols. The best solvent mixtures are those which form azeotropes boiling above 50° C.

As regards the carboxylic acids which are suitable for carrying the invention into effect, these may be selected from those which have already been proposed in the prior art, particularly in French Pat. No. 1 425 590, i.e. the formic, acetic, propionic, butyric or valeric acids; however, it may be highly advantageous to employ substituted acids, polyacids and aromatic acids, as for example monochloracetic, butane-tricarboxylic, benzoic, acetyl-salicylic acids or any other acid of this type.

The diketones which, according to the present invention, improve the elimination of the mineral impurities from the polymers, may correspond to the general formula

in which $R^1$ and $R^2$, similar or different, are hydrocarbon groups, mainly alkyl groups, particularly $C_1$ to $C_6$ groups, while R may be a hydrogen or an alkyl of $C_1$ to $C_6$. The typical example of such ketones is acetyl acetone $CH_3CO-CH_2-CO-CH_3$.

Also suitable are ketone esters, in which one of the carbonyls of the diketone is replaced by a carboxyl group, that is to say, compounds corresponding to the formula

it is thus possible to use, for example, an alkyl acetoacetate, this latter preferably being a $C_1$ to $C_6$ alkyl, particularly ethyl.

The components of the solvent mixture which are used in the present invention are known per se for purifying polypropylene; in particular, the mixtures of alcohols and hydrocarbons are in use at present for this purpose; however, the specific combination in accordance with the invention, which consists in using such a mixture to which a diketone and, at the same time, a carboxylic acid, are added, is entirely novel and has not so far been proposed for the combined separation of catalyst residues and atactic polymer.

Although β-diketones and keto-esters have already been proposed for washing polyolefines, particularly in U.S. Pat. No. 3,281,399, where these compounds have been used concurrently with alkylene oxides, they have not enabled the chlorine to be eliminated in a satisfactory manner; it is therefore an unexpected result to have obtained, according to the invention, an elimination of the impurities, including chlorine, by the novel combination which consists in including diketones in the hydrocarbon-alcohol-carboxylic acid mixtures.

As in the prior art, the treatment of the polymer by means of the solution of selected reactants is preferably carried out at the boiling point of the azeotrope formed by the hydrocarbon and the alcohol. However, thanks to the addition of the ketone compound, the time required for this operation can be shortened; for example, the use of the azeotrope mixture consisting of heptane and isopropyl alcohol with 0.5% of acetic acid requires at least one hour at the boiling point, while the addition of acetyl acetone, at the rate of 1 to 3% permits the time for the washing to be shortened to 30 minutes. Furthermore, and it is here that one of the important advantages of the invention becomes apparent, the concurrent use of the organic acid and of the ketone compound leads to an atactic polymer being obtained which is sufficiently low in impurities, as well as the isotatic polymer which corresponds perfectly to all the imposed purity standards.

It is to be noted that the process according to the invention provides a decided advantage as compared with the known process, which uses HCl, in that it has no corrosive action on the equipment, such as that of the prior art, and that it avoids any risk of toxicity.

Although the proportions of the materials being used may vary within fairly wide limits, depending on the degree of impurity in the crude polymer, they are preferably: 2 to 10 parts by weight of alcohol-hydrocarbon solvent mixture for 1 part of polymer, 1 to 5% of diketone and 0.5 to 4% of organic acid, related to the weight of solvent mixture.

The neutralization of the filtrate separated from the isotactic polypropylene can advantageously be effected by means of alkaline salts of weak acids, for example, acetates, propionates, isopropionates, butyrates, isopropylates, etc. of sodium or potassium.

In the non-limiting examples which follow, the separation of the isotactic and atatic polypropylenes has been effected at the same time as their purification, on a crude polymer powder obtained in polymerization reactions conducted in the conventional manner. The conditions of such a polymerization are given below by way of example.

The reactor proper is dried with heat under vacuum and under an inert atmosphere. One liter of heptane, of which the water content is less than 5 ppm. is introduced into the reactor. When the temperature is 65° C., the solution of aluminum alkyl in heptane and the suspension of TiCl$_3$ catalyst are injected thereinto. After very brief stirring, the vacuum is caused to reach the pressure corresponding to the vapour tension of the heptane, namely, 0.37 bar. These vary rapid operations are followed by the introduction of propylene to a pressure of 1.1 bars, followed by the necessary quantity of hydrogen (transfer agent) and finally propylene; the total working pressure as reached is 8 bars.

This pressure is maintained by continuous addition of monomer, throughout the reaction period, the outlet from the reactor being closed. A safety pellet calibrated to 11 kg ensures safety in the event of a sudden rise in pressure.

The polymerization temperature is 65° C. The catalyst comprises 2 millimoles of TiCl$_3.\frac{1}{3}$AlCl$_3$ and 5 millimoles of (C$_2$H$_5$)$_2$AlCl. Al/Ti=2.5.

The partial pressure of H$_2$ is 0.15 bar and that of C$_3$H$_6$ is 7.48 bars. The ratio of H$_2$ pressure to the total pressure is thus 0.0197.

Reaction time: 6 hours.

On completion of the reaction, the residual propylene is degasified and is emptied out by means of a nitrogen pressure.

So as to effect comparable separation operations following a like reaction, the suspension of polypropylene in heptane is discharged with each test into two identical stirred reactors provided with a double jacket and a filter plate of porosity 3. These glass reactors are provided at their base with an emptying valve. The separation according to the invention was carried out in one of the reactors, while the separation in accordance with the prior art (using anhydrous gaseous HCl) was effected in the other reactor.

In the following examples 1 and 2, the separation consisted of the following successive operations:
agitation of the crude polymer with the alcohol-hydrocarbon mixture containing carboxylic acid and the ketone compound (operation according to the invention) or with the alcohol-hydrocarbon mixture containing anhydrous gaseous HCl (operation according to the prior art);
rinsing on a filter with the same mixture of solvents.

In Example 3, the following successive operations were carried out:
elimination of the solvent from the polymerisation medium, by filtration under partial vacuum;
agitation of the separated crude polymer with the alcohol-hydrocarbon mixture containing carboxylic acid and the ketone compound (operation according to the invention) or with the alcohol-hydrocarbon mixture containing gaseous anhydrous HCl (prior art);
rinsing on a filter with the same mixture of solvents;
bringing the separated solid once again into suspension in the mixture of solvents;
a fresh rinsing on a filter.

EXAMPLE 1

On completing a polymerisation reaction, carried out as indicated above, the remaining propylene is degasified and the contents of the reactor are divided into two substantially equal parts; to each of the two fractions is added isopropyl alcohol in a suitable quantity for forming, with the heptane of the polymerization medium, an azeotropic mixture of 47.5% of isopropyl alcohol with 52.4% of normal heptane; for greater convenience, this mixture is called IPH in the remainder of the description.

The quantity of IPH is 4 parts by weight to 1 part of crude polypropylene.

To the first fraction are added, according to the invention, 2% of acetyl acetone, 1% of acetic acid, related to the weight of IPH. Into the second fraction is introduced, as in the aforementioned prior art, 0.4% of anhydrous gaseous HCl relatively to IPH.

Each of the two fractions is then subjected to heating under reflux, with boiling of the azeotrope at 77° C.

After 30 minutes of this treatment, hot filtration is carried out, followed by rinsing on a filter with 140 g of IPH. Each filtrate is in its turn separated into two substantially equal parts. From the first part, the solvent is evaporated to constant weight, while the second part is neutralized with a 20% solution of sodium isopropylate, after which its solvent is evaporated to constant weight, as above. In this way, there are obtained four samples of atactic polypropylene separated from the liquid which has served for the treatment of the crude polypropylene.

Given here are the quantitative conditions of these operations:

|  | Treatment according to the invention | Treatment according to prior art |
|---|---|---|
| Weight of IPH (isopropanol-heptane) mixture g | 500 | 500 |
| % acetyl acetone | 2 | — |
| % acetic acid | 1 | — |
| % HCl | — | 0.4 |
| recovered isotactic polypropylene, in g: | 108.5 | 126 |
| separated atactic polypropylene, in g: |  |  |
| by direct evaporation | 3.64 | 3.85 |
| after neutralization | 3.86 | 4.47 |
| Analysis of the separated polymers: |  |  |
| Isotactic : in ppm |  |  |
| ash | 420 | 430 |
| Ti | 30 | 27 |
| Al | 83 | 88 |
| Cl | 10 | 30 |

| Atactic : in % | Evaporation | Neutralization | Evaporation | Neutralization |
|---|---|---|---|---|
| ash | 2.33 | 8.42 | 3.00 | 13.40 |
| Ti | 0.60 | 0.56 | 0.55 | 0.51 |
| Al | 0.62 | 0.59 | 1.02 | 0.84 |
| total Cl | 2.89 | 2.85 | 26.09 | 21.05 |
| Na | — | 3.03 | — | 15.71 |

The results obtained show that the polymers, separated by the process of the invention, contain much less of chlorine ions than those which result from the conventional application of the solvent with HCl. The difference is particularly perceptible in respect of the atactic polypropylene; separated according to the invention, this requires much less base for its neutralization; it thus contains much less sodium than the product according to the prior method, after neutralization.

EXAMPLE 2

The treatment is effected as in Example 1, but the proportions of adjuvants in the following IPH mixture are changed:

|  | According to invention | According to prior art |
|---|---|---|
| % of acetyl acetone in the IPH | 1 | — |
| % of acetic acid in the IPH | 0.5 | — |
| % HCl in the IPH | — | 0.1 portion used at present in industry) |
| weight of isotactic polypropylene obtained g | 180 | 180 |

| its analysis, in ppm: |  |  |
|---|---|---|
| Ti | 17 | 18 |
| Al | 22 | 60 |
| Cl | <5 | 35 |
| weight of separated atactic polypropylene, g | 14.5 | 17 |
| its analysis after neutralization, in %: |  |  |
| Ti | 0.29 | 0.26 |
| Al | 0.49 | 0.38 |
| Cl | 1.55 | 5.38 |
| Na | 1.60 | 4.80 |

EXAMPLE 3

In the process according to the invention, the content of acetyl acetone in the IPH mixture is increased.

Following a polymerization carried out as previously indicated, the remaining propylene is degasified and the contents of the reactor are divided into two substantially equal parts; with each of them, the liquid is separated from the formed polymer and this latter is suspended in an azeotropic mixture of 47.6% of isopropyl alcohol with 52.4% of normal heptane (IPH mixture).

The quantity of IPH is 4 parts by weight to 1 part of crude polypropylene.

To the first of the said fractions are added, according to the invention, 3 of acetyl acetone and 1 of acetic acid, related to the weight of IPH.

Into the second fraction is introduced, as in the aforesaid prior art, 0.4 of anhydrous gaseous HCl, related to IPH.

Each of the two fractions is then subjected to heating under reflux, with boiling of the azeotrope at 77° C.

After 30 minutes of this treatment, hot filtration and rinsing on a filter with 140 g of IPH are carried out. The polymer remaining on each of the filters is brought into suspension in 520 g of pure IPH, the said suspension being agitated for about 30 minutes at a temperature of about 66° C. This suspension is then filtered and the separated polymer is rinsed on a filter with 140 g of pure IPH, the various liquid effluents, separated from the solid polymer during the treatment of the same fraction and containing the atactic polymer are reunited so as to form a resultant filtrate, and thus there is obtained a first filtrate corresponding to the treatment according to the invention and a second filtrate corresponding to the treatment according to the prior art. Each of the said filtrates is neutralized with a 20% solution of sodium isopropylate, after which its solvent is evaporated to constant weight. In this way, there are obtained two samples of atactic polypropylene separated from the liquid which has served for the treatment of the crude polypropylene.

The analysis of the crude polymer, prior to separation, indicates in ppm:

| ash | 1800 |
|---|---|
| Ti | 395 |
| Al | 543 |
| Cl | 2000 |

After the separation, the following results are found:

|  | Invention | Prior art |
|---|---|---|
| Isotactic polypropylene obtained: g | 115 | 115 |
| its analysis: ppm |  |  |
| Ti | 6 | 6 |
| Al | 20 | 37 |
| Cl | <5 | 35 |
| Neutralized atactic polypropylene obtained: g (contained in the different reunited filtrates) | 8 | 8.2 |
| its analysis in: |  |  |
| Ti | 0.58 | 0.58 |
| Al | 0.91 | 0.88 |
| Cl | 2.84 | 26.00 |
| Na | 3.01 | 24.00 |

It is seen that the atactic polymer, separated according to the invention, includes 9 times less chlorine and 8 times less sodium than the corresponding polymer, obtained according to the prior art.

EXAMPLE 4

On completion of a polymerization, carried out as previously indicated, the remaining propylene is degasified and the contents of the reactor are treated for separating the liquid from the formed polymer, and this latter is brought into suspension in an azeotropic mixture of 47.6% of isopropyl alcohol with 52.4% of normal heptane (IPH mixture). The quantity of IPH is 4 parts by weight for 1 part of crude polypropylene.

To the suspension as obtained are added 2% of acetyl acetone and 1% of butane-tricarboxylic acid, related to the weight of IPH.

The mixture as thus formed is subjected to heating under reflux, with boiling of the azeotrope at 77° C.

After 30 minutes of this treatment, hot filtration is carried out followed by rinsing on a filter with 140 g of IPH. The polymer remaining on the filter is suspended in 520 g of pure IPH, the suspension being agitated for about 35 minutes at a temperature in the region of 66° C. This suspension is then filtered and the separated polymer is rinsed on a filter with 145 g of pure IPH. The various liquid effluents, separated from the solid polymer during the treatment and containing the atactic polymer, are reunited in order to form a resultant filtrate. The solvent of this filtrate is evaporated to constant weight and the atactic polypropylene which has served for the treatment of the crude polypropylene is obtained.

On completing the treatment, there are collected 348 g of isotactic polypropylene and 21 g of atactic polypropylene.

The analysis of the isotactic and atactic polypropylene leads to the following results:

| Isotactic polypropylene: |  |  |
|---|---|---|
|  | ash | 59 ppm |
|  | Ti | 10 ppm |
|  | Al | 14 ppm |
|  | Cl | <5 ppm |
| Atactic polypropylene |  |  |
|  | Ti | 0.44% |
|  | Al | 0.70% |
|  | Cl | 2.18% |

EXAMPLE 5

A procedure similar to that of Example 4 is followed, but replacing the butane-tricarboxylic acid by the same quantity (1% relatively to the weight of IPH) of propionic acid.

On completing the treatment, there are collected 330 g of isotactic polypropylene and 20 g of atactic polypropylene, of which the respective analyses lead to the following results:

| Isotactic polypropylene: |  |  |
|---|---|---|
|  | Ti | 14 ppm |
|  | Al | 9 ppm |
|  | Cl | <5 ppm |
| Atactic polypropylene: |  |  |
|  | Ti | 0.46% |
|  | Al | 0.75% |
|  | Cl | 2.3% |

EXAMPLE 6

A procedure similar to that of Example 4 is followed, but replacing the butane-tricarboxylic acid and the acetyl acetone by acetic acid and ethyl acetoacetate, respectively.

The quantities of acetic acid and ethyl acetoacetate, related to the weight of IPH, are 1% and 2%, respectively.

On completing the treatment, there are collected 322 g of isotactic polypropylene and 22 g of atactic polypropylene.

The analysis of these polymers gives the following results:

| Isotactic polypropylene: |  |  |
|---|---|---|
|  | Ti | 9 ppm |
|  | Al | 12 ppm |
|  | Cl | <5 ppm |
| Atactic polypropylene: |  |  |
|  | Ti | 0.42% |
|  | Al | 0.63% |
|  | Cl | 2.1% |

EXAMPLE 7

Polypropylene is prepared by polymerizing propylene in the presence of a catalyst system containing 5 millimoles of $(C_2H_5)_2AlCl$ and 2 millimoles of $TiCl_3 \cdot \frac{1}{3}AlCl_3$, in liquid propylene at 65° C. and under a pressure of 26.5 bars.

After 2 hours of polymerization, the monomeric propylene is degasified and the polypropylene placed under nitrogen is washed with an IPH mixture (47.6% of isopropyl alcohol and 52.4% of normal heptane), which also contains, by weight, 2% of acetyl acetone and 1% of acetic acid; the operation takes place at 77° C., i.e. at the boiling point of the IPH mixture.

After 30 minutes of this treatment, hot filtration is carried out and the solid product, remaining on the filter, namely, the isotactic polypropylene, is rinsed on the filter with 140 g of pure IPH.

The filtrates are combined. The solvent of the resultant filtrate is then evaporated so as to isolate the atactic polypropylene.

Following the treatment, 402 g of isotactic polypropylene and 41 g of atactic polypropylene are collected.

The analysis of these polymers leads to the following results:

| isotactic: |  |  |
|---|---|---|
|  | Ti | 6 ppm |

| -continued | | |
|---|---|---|
| | Al | 10 ppm |
| | Cl | <5 ppm |
| atactic: | Ti | 0.24% |
| | Al | 0.36% |
| | Cl | 1.12% |

I claim:

1. A process for obtaining purified polypropylene which comprises polymerizing propylene in the presence of a Ziegler catalyst containing titanium chloride, aluminum chloride and alkyl aluminum chloride to obtain a crude solid polymer, contacting said crude polymer with a treatment liquid comprising (a) an azeotropic mixture having a boiling point of less than 100° C. of a hydrocarbon and a lower alcohol, (b) 1–5% based on the weight of said mixture of a diketone or ketone ester and (c) carboxylic acid selected from the group consisting of aliphatic carboxylic and benzoic acid and acetyl salicylic acid, and recovering the resulting purified isotactic polypropylene and the resulting purified atactic polypropylene.

2. The process of claim 1 wherein said azeotropic mixture has a boiling point greater than 50° C.

3. The process of claim 2 wherein said contacting is effected at reflux.

4. The process of claim 1 wherein said carboxylic acid is selected from the group consisting of acetic, formic, propionic, butyric, valeric, chloroacetic and butane tricarboxylic acids.

5. The process of claim 1 wherein the diketone corresponds to the formula $R^1$—CO—CHR—CO—$R_2$ and the ketone ester is defined by the formula $R^1$—CO—CHR—COOR$^2$, wherein $R^1$ and $R^2$ individually are hydrocarbon groups and R is a hydrogen atom or a $C_1$ to $C_6$ alkyl.

6. The process of claim 1 wherein said azeotropic mixture is a mixture of 47.6 parts by weight isopropanol and 52.4 parts of normal heptane.

7. The process of claim 1 wherein said hydrocarbon is a saturated 6 to 8 carbon atom hydrocarbon.

8. The process of claim 7 wherein said azeotropic mixture has a boiling point greater than 50° C. and is employed in an amount of 2–10 parts by weight per part of crude polymer and wherein said acid is employed in an amount of 0.5–4% based on the weight of said azeotropic mixture.

9. The process of claim 8 wherein said (b) is acetyl acetone.

10. The process of claim 8 wherein said (b) is ethyl acetyl acetate.

11. A process for obtaining purified polypropylene which comprises polymerizing propylene in the presence of a Ziegler catalyst containing $TiCl_3.\frac{1}{3}AlCl_3$ and $(C_2H_5)_2AlCl$ to obtain a crude solid polymer, contacting said crude polymer with a treatment liquid comprising (a) an azeotropic mixture of 47.6 parts by weight of isopropanol and 52.4 parts of normal heptane, (b) 1–5 weight percent based on the weight of said mixture of acetyl acetone or ethyl acetyl acetate, and (c) 0.5 to 4 weight percent of a carboxylic acid selected from the group consisting of acetic acid, propionic acid and butane-tricarboxylic acid, at reflux, and recovering the resulting purified isotactic polypropylene and the resulting purified atactic polypropylene.

12. The process of claim 11 wherein said azeotropic mixture is employed in an amount of 2–10 parts per part of crude polymer and said (b) is acetyl acetate.

13. The process of claim 11 wherein said azeotropic mixture is employed in an amount of 2–10 parts per part of crude polymer and said (b) is ethyl acetyl acetate.

* * * * *